United States Patent
Sheu et al.

(10) Patent No.: US 10,182,350 B2
(45) Date of Patent: Jan. 15, 2019

(54) KEY ASSIGNMENT FOR A BRAND

(71) Applicant: ARRIS Enterprises LLC, Suwanee, GA (US)

(72) Inventors: Ming-Jye Sheu, San Jose, CA (US); Prashant Ranade, San Jose, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 14/692,485

(22) Filed: Apr. 21, 2015

(65) Prior Publication Data

US 2015/0257009 A1    Sep. 10, 2015

Related U.S. Application Data

(63) Continuation of application No. 13/439,844, filed on Apr. 4, 2012, now Pat. No. 9,092,610.

(51) Int. Cl.
| | |
|---|---|
| G06F 15/16 | (2006.01) |
| H04W 12/08 | (2009.01) |
| H04W 12/04 | (2009.01) |
| H04W 12/06 | (2009.01) |
| G06F 21/44 | (2013.01) |
| H04L 9/08 | (2006.01) |
| G06F 17/30 | (2006.01) |

(52) U.S. Cl.
CPC ............ *H04W 12/08* (2013.01); *G06F 21/44* (2013.01); *H04L 9/0819* (2013.01); *H04W 12/04* (2013.01); *H04W 12/06* (2013.01)

(58) Field of Classification Search
CPC ............................. G06F 21/44; H04L 9/0819
USPC .......... 726/1, 6, 3; 380/28, 44; 713/169, 170
See application file for complete search history.

(56) References Cited

U.S. PATENT DOCUMENTS

| | | | |
|---|---|---|---|
| 4,176,356 A | 11/1979 | Foster | |
| 4,193,077 A | 3/1980 | Greenberg | |
| 4,253,193 A | 2/1981 | Kennard | |
| 4,305,052 A | 12/1981 | Baril | |
| 4,513,412 A | 4/1985 | Cox | |
| 4,814,777 A | 3/1989 | Monser | |

(Continued)

FOREIGN PATENT DOCUMENTS

| | | |
|---|---|---|
| CN | 1708162 | 12/2005 |
| CN | 1316862 | 10/2011 |

(Continued)

OTHER PUBLICATIONS

US 9,015,816, 04/2015, Sheu (withdrawn)

(Continued)

*Primary Examiner* — Gary S Gracia
(74) *Attorney, Agent, or Firm* — Stewart M. Wiener

(57) ABSTRACT

Systems and methods for providing secured network access are provided. A user device located within range of a branded hotspot initiates a request for the secured network access. The request concerns secured network access at the hotspot by the user device and includes a unique pre-shared key. A query regarding the unique pre-shared key is sent to a database, which retrieves information regarding a corresponding pre-shared key. That information is sent to the hotspot controller, which allows the user device secured network access as governed by one or more parameters associated with the pre-shared key.

19 Claims, 2 Drawing Sheets

(56) References Cited

U.S. PATENT DOCUMENTS

| | | | |
|---|---|---|---|
| 5,097,484 A | 3/1992 | Akaiwa | |
| 5,173,711 A | 12/1992 | Takeuchi | |
| 5,203,010 A | 4/1993 | Felix | |
| 5,220,340 A | 6/1993 | Shafai | |
| 5,373,548 A | 12/1994 | McCarthy | |
| 5,507,035 A | 4/1996 | Bantz | |
| 5,559,800 A | 9/1996 | Mousseau | |
| 5,754,145 A | 5/1998 | Evans | |
| 5,767,809 A | 6/1998 | Chuang | |
| 5,802,312 A | 9/1998 | Lazaridis | |
| 5,964,830 A | 10/1999 | Durett | |
| 6,034,638 A | 3/2000 | Thiel | |
| 6,094,177 A | 7/2000 | Yamamoto | |
| 6,266,528 B1 | 7/2001 | Farzaneh | |
| 6,292,153 B1 | 9/2001 | Aiello | |
| 6,307,524 B1 | 10/2001 | Britain | |
| 6,317,599 B1 | 11/2001 | Rappaport | |
| 6,326,922 B1 | 12/2001 | Hegendoerfer | |
| 6,337,628 B2 | 1/2002 | Campana | |
| 6,337,668 B1 | 1/2002 | Ito | |
| 6,339,404 B1 | 1/2002 | Johnson | |
| 6,345,043 B1 | 2/2002 | Hsu | |
| 6,356,242 B1 | 3/2002 | Ploussios | |
| 6,356,243 B1 | 3/2002 | Schneider | |
| 6,356,905 B1 | 3/2002 | Gershman | |
| 6,377,227 B1 | 4/2002 | Zhu | |
| 6,392,610 B1 | 5/2002 | Braun | |
| 6,404,386 B1 | 6/2002 | Proctor | |
| 6,407,719 B1 | 6/2002 | Ohira | |
| 6,442,507 B1 | 8/2002 | Skidmore | |
| 6,445,688 B1 | 9/2002 | Garces | |
| 6,493,679 B1 | 12/2002 | Rappaport | |
| 6,498,589 B1 | 12/2002 | Horii | |
| 6,499,006 B1 | 12/2002 | Rappaport | |
| 6,507,321 B2 | 1/2003 | Oberschmidt | |
| 6,625,454 B1 | 9/2003 | Rappaport | |
| 6,674,459 B2 | 1/2004 | Ben-Shachar | |
| 6,701,522 B1 | 3/2004 | Rubin | |
| 6,725,281 B1 | 4/2004 | Zintel | |
| 6,753,814 B2 | 6/2004 | Killen | |
| 6,762,723 B2 | 7/2004 | Nallo | |
| 6,772,331 B1 | 8/2004 | Hind et al. | |
| 6,779,004 B1 | 8/2004 | Zintel | |
| 6,807,577 B1 | 10/2004 | Gillespie | |
| 6,819,287 B2 | 11/2004 | Sullivan | |
| 6,876,280 B2 | 4/2005 | Nakano | |
| 6,888,504 B2 | 5/2005 | Chiang | |
| 6,888,893 B2 | 5/2005 | Li | |
| 6,892,230 B1 | 5/2005 | Gu | |
| 6,906,678 B2 | 6/2005 | Chen | |
| 6,910,068 B2 | 6/2005 | Zintel | |
| 6,924,768 B2 | 8/2005 | Wu | |
| 6,931,429 B2 | 8/2005 | Gouge | |
| 6,941,143 B2 | 9/2005 | Mathur | |
| 6,947,727 B1 | 9/2005 | Brynielsson | |
| 6,950,019 B2 | 9/2005 | Bellone | |
| 6,950,523 B1 | 9/2005 | Brickell | |
| 6,961,028 B2 | 11/2005 | Joy | |
| 6,973,622 B1 | 12/2005 | Rappaport | |
| 6,975,834 B1 | 12/2005 | Forster | |
| 7,034,770 B2 | 4/2006 | Yang | |
| 7,043,277 B1 | 5/2006 | Pfister | |
| 7,043,633 B1 | 5/2006 | Fink et al. | |
| 7,050,809 B2 | 5/2006 | Lim | |
| 7,064,717 B2 | 6/2006 | Kaluzni | |
| 7,085,814 B1 | 8/2006 | Ghandi | |
| 7,089,307 B2 | 8/2006 | Zintel | |
| 7,116,707 B1 | 10/2006 | Armistead | |
| 7,127,234 B2 | 10/2006 | Ishii | |
| 7,130,895 B2 | 10/2006 | Zintel | |
| 7,171,475 B2 | 1/2007 | Weisman | |
| 7,181,620 B1 | 2/2007 | Hur | |
| 7,197,297 B2 | 3/2007 | Myles | |
| 7,234,063 B1 | 6/2007 | Baugher | |
| 7,234,156 B2 | 6/2007 | French et al. | |
| 7,263,076 B1 | 8/2007 | Leibovitz et al. | |
| 7,292,870 B2 | 11/2007 | Heredia et al. | |
| 7,363,354 B2 | 4/2008 | Lahti | |
| 7,421,578 B1 | 9/2008 | Huang et al. | |
| 7,477,894 B1 | 1/2009 | Sinha | |
| 7,505,434 B1 | 3/2009 | Backes | |
| 7,562,385 B2 | 7/2009 | Thione et al. | |
| 7,565,529 B2 | 7/2009 | Beck | |
| 7,599,380 B2 | 10/2009 | Whitten | |
| 7,669,232 B2 | 2/2010 | Jou | |
| 7,715,833 B2 | 5/2010 | Sanchez | |
| 7,722,502 B2 | 5/2010 | Holkkola | |
| 7,788,703 B2 | 8/2010 | Jou | |
| 7,966,497 B2 | 6/2011 | Gantman et al. | |
| 8,005,459 B2 | 8/2011 | Balsillie | |
| 8,009,644 B2 | 8/2011 | Kuo | |
| 8,091,120 B2 | 1/2012 | Perrella et al. | |
| 8,108,904 B1 | 1/2012 | Chickering et al. | |
| 8,260,278 B2 | 9/2012 | Landsman et al. | |
| 8,272,036 B2 | 9/2012 | Jou | |
| 8,355,912 B1 | 1/2013 | Keesey et al. | |
| 8,484,707 B1* | 7/2013 | Bertz | B60R 25/24 705/65 |
| 8,605,697 B2 | 12/2013 | Kuo | |
| 8,607,315 B2 | 12/2013 | Jou | |
| 8,756,668 B2 | 6/2014 | Ranade et al. | |
| 8,923,265 B2 | 12/2014 | Kuo | |
| 9,071,583 B2 | 6/2015 | Yang | |
| 9,092,610 B2 | 7/2015 | Sheu | |
| 9,131,378 B2 | 9/2015 | Jou | |
| 9,226,146 B2 | 12/2015 | Ranade et al. | |
| 2002/0009199 A1 | 1/2002 | Ala-Laurila et al. | |
| 2002/0022483 A1 | 2/2002 | Thompson et al. | |
| 2002/0031130 A1 | 3/2002 | Tsuchiya | |
| 2002/0047800 A1 | 4/2002 | Proctor | |
| 2002/0080767 A1 | 6/2002 | Lee | |
| 2002/0084942 A1 | 7/2002 | Tsai | |
| 2002/0105471 A1 | 8/2002 | Kojima | |
| 2002/0112058 A1 | 8/2002 | Weisman | |
| 2002/0158798 A1 | 10/2002 | Chang | |
| 2002/0169966 A1 | 11/2002 | Nyman | |
| 2002/0170064 A1 | 11/2002 | Monroe | |
| 2003/0026240 A1 | 2/2003 | Eyuboglu | |
| 2003/0030588 A1 | 2/2003 | Kalis | |
| 2003/0063591 A1 | 4/2003 | Leung | |
| 2003/0122714 A1 | 7/2003 | Wannagot | |
| 2003/0156558 A1 | 8/2003 | Cromer et al. | |
| 2003/0162533 A1 | 8/2003 | Moles | |
| 2003/0169330 A1 | 9/2003 | Ben-Shachar | |
| 2003/0184490 A1 | 10/2003 | Raiman | |
| 2003/0189514 A1 | 10/2003 | Miyano | |
| 2003/0189521 A1 | 10/2003 | Yamamoto | |
| 2003/0189523 A1 | 10/2003 | Ojantakanen | |
| 2003/0191935 A1 | 10/2003 | Ferguson | |
| 2003/0196084 A1 | 10/2003 | Okereke | |
| 2003/0202486 A1 | 10/2003 | Anton et al. | |
| 2003/0210207 A1 | 11/2003 | Suh | |
| 2003/0227414 A1 | 12/2003 | Saliga | |
| 2004/0014432 A1 | 1/2004 | Boyle | |
| 2004/0017310 A1 | 1/2004 | Vargas-Hurlston | |
| 2004/0017860 A1 | 1/2004 | Liu | |
| 2004/0027291 A1 | 2/2004 | Zhang | |
| 2004/0027304 A1 | 2/2004 | Chiang | |
| 2004/0030900 A1 | 2/2004 | Clark | |
| 2004/0032378 A1 | 2/2004 | Volman | |
| 2004/0036651 A1 | 2/2004 | Toda | |
| 2004/0036654 A1 | 2/2004 | Hsieh | |
| 2004/0041732 A1 | 3/2004 | Aikawa | |
| 2004/0048593 A1 | 3/2004 | Sano | |
| 2004/0058690 A1 | 3/2004 | Ratzel | |
| 2004/0061653 A1 | 4/2004 | Webb | |
| 2004/0070543 A1 | 4/2004 | Masaki | |
| 2004/0073786 A1 | 4/2004 | O'Neill | |
| 2004/0080455 A1 | 4/2004 | Lee | |
| 2004/0095278 A1 | 5/2004 | Kanemoto | |
| 2004/0097217 A1 | 5/2004 | McClain | |
| 2004/0114535 A1 | 6/2004 | Hoffman | |
| 2004/0121749 A1 | 6/2004 | Cui et al. | |
| 2004/0125777 A1 | 7/2004 | Doyle | |

(56) References Cited

U.S. PATENT DOCUMENTS

| | | |
|---|---|---|
| 2004/0141617 A1 | 7/2004 | Volpano |
| 2004/0153647 A1 | 8/2004 | Rotholtz et al. |
| 2004/0190477 A1 | 9/2004 | Olson |
| 2004/0203593 A1 | 10/2004 | Whelan |
| 2004/0214570 A1 | 10/2004 | Zhang |
| 2004/0214572 A1 | 10/2004 | Thompson et al. |
| 2004/0236939 A1* | 11/2004 | Watanabe ........... H04L 63/0428 713/150 |
| 2004/0260800 A1 | 12/2004 | Gu |
| 2005/0022210 A1 | 1/2005 | Zintel |
| 2005/0041739 A1 | 2/2005 | Li |
| 2005/0042988 A1 | 2/2005 | Hoek |
| 2005/0050352 A1 | 3/2005 | Narayanaswami et al. |
| 2005/0074018 A1 | 4/2005 | Zintel |
| 2005/0097503 A1 | 5/2005 | Zintel |
| 2005/0100166 A1 | 5/2005 | Smetters |
| 2005/0129222 A1 | 6/2005 | Creamer et al. |
| 2005/0135480 A1 | 6/2005 | Li |
| 2005/0138137 A1 | 6/2005 | Encamacion |
| 2005/0138193 A1 | 6/2005 | Encamacion |
| 2005/0152305 A1 | 7/2005 | Ji et al. |
| 2005/0165953 A1 | 7/2005 | Oba et al. |
| 2005/0180381 A1 | 8/2005 | Retzer |
| 2005/0188193 A1 | 8/2005 | Kuehnel |
| 2005/0220048 A1 | 10/2005 | Lee et al. |
| 2005/0222933 A1 | 10/2005 | Wesby |
| 2005/0223086 A1* | 10/2005 | Raverdy ............... H04W 48/08 709/220 |
| 2005/0228874 A1 | 10/2005 | Edgett |
| 2005/0240665 A1 | 10/2005 | Gu |
| 2005/0250472 A1 | 11/2005 | Silvester |
| 2005/0261970 A1 | 11/2005 | Vucina et al. |
| 2005/0267935 A1 | 12/2005 | Ghandi |
| 2005/0268107 A1 | 12/2005 | Harris |
| 2006/0007897 A1 | 1/2006 | Ishii |
| 2006/0031922 A1 | 2/2006 | Sakai |
| 2006/0046730 A1 | 3/2006 | Briancon et al. |
| 2006/0052085 A1 | 3/2006 | Gregrio Rodriguez et al. |
| 2006/0080415 A1 | 4/2006 | Tu |
| 2006/0080741 A1 | 4/2006 | Nair |
| 2006/0089123 A1 | 4/2006 | Frank |
| 2006/0094371 A1 | 5/2006 | Nguyen |
| 2006/0094400 A1 | 5/2006 | Beachem et al. |
| 2006/0098607 A1 | 5/2006 | Zeng |
| 2006/0123124 A1 | 6/2006 | Weisman |
| 2006/0123125 A1 | 6/2006 | Weisman |
| 2006/0123455 A1 | 6/2006 | Pai |
| 2006/0133405 A1 | 6/2006 | Fee |
| 2006/0153387 A1* | 7/2006 | Lee ..................... H04L 63/0428 380/277 |
| 2006/0165103 A1 | 7/2006 | Trudeau et al. |
| 2006/0168159 A1 | 7/2006 | Weisman |
| 2006/0184660 A1 | 8/2006 | Rao |
| 2006/0184661 A1 | 8/2006 | Weisman |
| 2006/0184693 A1 | 8/2006 | Rao |
| 2006/0189298 A1 | 8/2006 | Marcelli |
| 2006/0200851 A1 | 9/2006 | Hung |
| 2006/0208088 A1* | 9/2006 | Sekiguchi ............. G06K 7/1095 235/472.02 |
| 2006/0223527 A1 | 10/2006 | Lee et al. |
| 2006/0224690 A1 | 10/2006 | Falkenburg |
| 2006/0225107 A1 | 10/2006 | Seetharaman |
| 2006/0227761 A1 | 10/2006 | Scott |
| 2006/0239369 A1 | 10/2006 | Lee |
| 2006/0251256 A1 | 11/2006 | Asokan et al. |
| 2006/0291434 A1 | 12/2006 | Gu |
| 2007/0025302 A1 | 2/2007 | Zhang et al. |
| 2007/0027622 A1 | 2/2007 | Cleron |
| 2007/0047449 A1 | 3/2007 | Berger et al. |
| 2007/0055752 A1 | 3/2007 | Wiegand et al. |
| 2007/0121525 A1* | 5/2007 | Jenster ............... G06Q 10/06 370/252 |
| 2007/0124490 A1 | 5/2007 | Kalavade et al. |
| 2007/0130294 A1 | 6/2007 | Nishio |
| 2007/0130456 A1 | 6/2007 | Kuo |
| 2007/0135167 A1 | 6/2007 | Liu |
| 2007/0143832 A1 | 6/2007 | Perrella et al. |
| 2007/0150736 A1 | 6/2007 | Cukier |
| 2007/0165582 A1 | 7/2007 | Batta |
| 2007/0189537 A1 | 8/2007 | Zhang et al. |
| 2007/0199053 A1 | 8/2007 | Sandhu et al. |
| 2007/0211659 A1 | 9/2007 | Li et al. |
| 2007/0249324 A1 | 10/2007 | Jou |
| 2007/0287450 A1 | 12/2007 | Yang |
| 2007/0293951 A1 | 12/2007 | Takahashi |
| 2007/0294528 A1 | 12/2007 | Shoji et al. |
| 2008/0060064 A1 | 3/2008 | Wynn et al. |
| 2008/0075280 A1 | 3/2008 | Ye et al. |
| 2008/0085723 A1 | 4/2008 | Tsao et al. |
| 2008/0089242 A1 | 4/2008 | Whitten |
| 2008/0109657 A1 | 5/2008 | Bajaj et al. |
| 2008/0119165 A1 | 5/2008 | Mittal et al. |
| 2008/0141244 A1 | 6/2008 | Kelley |
| 2008/0208617 A1 | 8/2008 | Onyon et al. |
| 2008/0212535 A1 | 9/2008 | Karaoguz et al. |
| 2008/0307515 A1 | 12/2008 | Drokov et al. |
| 2009/0005005 A1 | 1/2009 | Forstall et al. |
| 2009/0013210 A1 | 1/2009 | McIntosh et al. |
| 2009/0059288 A1* | 3/2009 | Mitsui ................ H04N 1/00464 358/1.15 |
| 2009/0070859 A1* | 3/2009 | Mathur ............... H04L 63/0236 726/5 |
| 2009/0089583 A1* | 4/2009 | Patel .................... H04W 12/04 713/171 |
| 2009/0092255 A1 | 4/2009 | Jou |
| 2009/0103731 A1 | 4/2009 | Sarikaya |
| 2009/0119190 A1 | 5/2009 | Realini |
| 2009/0187970 A1 | 7/2009 | Mower et al. |
| 2009/0193118 A1 | 7/2009 | Cox et al. |
| 2009/0217048 A1 | 8/2009 | Smith |
| 2010/0070542 A1 | 3/2010 | Feinsmith |
| 2010/0299518 A1 | 11/2010 | Viswanathan et al. |
| 2010/0332828 A1 | 12/2010 | Goto |
| 2011/0007705 A1 | 1/2011 | Buddhikot et al. |
| 2011/0035624 A1 | 2/2011 | Miller |
| 2011/0040870 A1 | 2/2011 | Wynn et al. |
| 2011/0047603 A1* | 2/2011 | Gordon ................... H04L 63/06 726/5 |
| 2011/0055898 A1 | 3/2011 | Jou |
| 2011/0126016 A1 | 5/2011 | Sun |
| 2011/0145593 A1* | 6/2011 | Auradkar ............. G06F 21/6218 713/189 |
| 2011/0208866 A1 | 8/2011 | Marmolejo-Meillon et al. |
| 2011/0246765 A1* | 10/2011 | Schibuk ............... H04L 63/0428 713/158 |
| 2011/0264906 A1* | 10/2011 | Pourzandi ........... G06F 21/6218 713/153 |
| 2011/0271111 A1 | 11/2011 | Frank et al. |
| 2011/0281609 A1 | 11/2011 | Kuo |
| 2012/0030466 A1 | 2/2012 | Yamaguchi |
| 2012/0054338 A1 | 3/2012 | Ando |
| 2012/0078949 A1 | 3/2012 | Allen et al. |
| 2012/0079097 A1* | 3/2012 | Gopisetty ............. G06F 9/5083 709/224 |
| 2012/0089845 A1 | 4/2012 | Raleigh |
| 2012/0134291 A1 | 5/2012 | Raleigh |
| 2012/0257536 A1 | 10/2012 | Kholaif et al. |
| 2012/0278654 A1 | 11/2012 | Shen |
| 2012/0284785 A1 | 11/2012 | Salkintzis et al. |
| 2012/0317625 A1 | 12/2012 | Jou |
| 2012/0322035 A1 | 12/2012 | Julia et al. |
| 2013/0007853 A1 | 1/2013 | Gupta et al. |
| 2013/0047218 A1 | 2/2013 | Smith |
| 2013/0111217 A1* | 5/2013 | Kopasz ............... G06F 21/6245 713/189 |
| 2013/0173916 A1* | 7/2013 | Sato .................... G06F 21/6218 713/165 |
| 2013/0182693 A1 | 7/2013 | Sperling et al. |
| 2013/0223222 A1* | 8/2013 | Kotecha ............... H04L 43/0882 370/235 |
| 2013/0269008 A1 | 10/2013 | Shtrom |
| 2014/0007209 A1 | 1/2014 | Zucker |

(56) References Cited

U.S. PATENT DOCUMENTS

| | | |
|---|---|---|
| 2014/0066112 A1 | 3/2014 | Kuo |
| 2014/0068724 A1 | 3/2014 | Jou |
| 2014/0282951 A1 | 9/2014 | Ranade |
| 2015/0133089 A1 | 5/2015 | Kuo |
| 2015/0296377 A1 | 10/2015 | Sheu |

FOREIGN PATENT DOCUMENTS

| | | |
|---|---|---|
| CN | 103441984 | 12/2013 |
| CN | 103858106 | 6/2014 |
| EP | 0 352 787 | 7/1989 |
| EP | 0 534 612 | 3/1993 |
| EP | 1 315 311 | 5/2003 |
| EP | 1 450 521 | 8/2004 |
| EP | 1 608 108 | 12/2005 |
| EP | 1 638 261 | 3/2006 |
| EP | 1 724 691 | 11/2006 |
| EP | 2 705 429 | 3/2014 |
| EP | 1 958 369 | 4/2015 |
| JP | 3038933 | 7/1989 |
| JP | 2008/088633 | 2/1996 |
| JP | 2001/057560 | 2/2002 |
| JP | 2005/354249 | 12/2005 |
| JP | 2006/060408 | 3/2006 |
| JP | 2014-522142 | 8/2014 |
| TW | 201351188 | 12/2013 |
| WO | WO 2001/084323 | 11/2001 |
| WO | WO 2002/025967 | 3/2002 |
| WO | WO 2003/079484 | 9/2003 |
| WO | WO 2007/064822 | 6/2007 |
| WO | WO 2007/127120 | 11/2007 |
| WO | WO 2007/127162 | 11/2007 |
| WO | WO 2012/151224 | 11/2012 |
| WO | WO 2013/119750 | 8/2013 |
| WO | WO 2013/152027 | 10/2013 |

OTHER PUBLICATIONS

U.S. Appl. No. 14/981,579, Prashant Ranade, Dynamic PSK for Hotspots, filed Dec. 28, 2015
U.S. Appl. No. 14/586,396, Ted Tsei Kuo, On-Demand Services by Wireless Base Station Virtualization, filed Dec. 30, 2014
U.S. Appl. No. 13/461,679, Final Office Action dated May 28, 2015.
U.S. Appl. No. 14/751,833, Ming-Jye Sheu, Sharing Security Keys With Headless Devices, filed Jun. 26, 2015
Chinese Office Action for CN Application No. 201280021332.7 dated Dec. 11, 2015.
Aboba, Bernard "Virtual Access Points," IEEEP802.11 Wireless LANs, XX, XX, No. 802.11-03/154rl, May 22, 2003.
Areg Alimian et al., "Analysis of Roaming Techniques," doc.:IEEE 802.11-04/0377r1, Submission, Mar. 2004.
Bargh et al., "Fast Authentication Methods for Handovers between IEEE 802.11 Wireless LANs", Proceedings of the ACM International Workshop on Wireless Mobile Applications and Services on WLAN Hotspots. Oct. 1, 2004.
Chang, Nicholas B. et al., "Optimal Channel Probing and Transmission Scheduling for Opportunistics Spectrum Access," Sep. 2007.
Cisco Systems, "Cisco Aironet Access Point Software Configuration Guide: Configuring Filters and Quality of Service," Aug. 2003.
Dell Inc., "How Much Broadcast and Multicast Traffic Should I Allow in My Network," PowerConnect Application Note #5, Nov. 2003.
Dunkels, Adam et al., "Connecting Wireless Sensornets with TCP/IP Networks," Proc. of the 2d Int'l Conf. on Wired Networks, Frankfurt, Feb. 2004.
Dunkels, Adam et al., "Making TCP/IP Viable for Wireless Sensor Networks," Proc. of the 1st Euro. Workshop on Wireless Sensor Networks, Berlin, Jan. 2004.
Dutta, Ashutosh et al., "MarconiNet Supporting Streaming Media Over Localized Wireless Multicast," Proc. of the 2d Int'l Workshop on Mobile Commerce, 2002.
Encrypted Preshared key; cisco corp. 14 pages, 2010 (Date of Download: Nov. 20, 2013).
Festag, Andreas, "What is MOMBASA?" Telecommunication Networks Group (TKN), Technical University of Berlin, Mar. 7, 2002.
Golmie, Nada, "Coexistence in Wireless Networks: Challenges and System-Level Solutions in the Unlicensed Bands," Cambridge University Press, 2006.
Hewlett Packard, "HP ProCurve Networking: Enterprise Wireless LAN Networking and Mobility Solutions," 2003.
Hirayama, Koji et al., "Next-Generation Mobile-Access IP Network," Hitachi Review vol. 49, No. 4, 2000.
Ian F. Akyildiz, et al., "A Virtual Topology Based Routing Protocol for Multihop Dynamic Wireless Networks," Broadband and Wireless Networking Lab, School of Electrical and Computer Engineering, Georgia Institute of Technology.
IEEE Trial-Use Recommended Practice for Multi-Vendor Access Point Interoperability via an Inter-Access Point Protocol Across Distribution Systems Supporting IEEE 802.11 Operation; IEEE Std 802.11 F-2003 ED, IEEE Standard, IEEE, Piscataway, NJ, USA, Jan. 1, 2003, pp. 1-67.
Information Society Technologies Ultrawaves, "System Concept / Architecture Design and Communication Stack Requirement Document," Feb. 23, 2004.
Kassab et al., "Fast Pre-Authentication Based on Proactive Key Distribution for 802.11 Infrastructure Networks", WMuNeP'05, Oct. 13, 2005, Montreal, Quebec, Canada, Copyright 2005 ACM.
Keidl et al., TES2003, LNCS v. 2819, pp. 104-118, Sep. 2003.
Ken Tang, et al., "MAC Layer Broadcast Support in 802.11 Wireless Networks," Computer Science Department, University of California, Los Angeles, 2000 IEEE, pp. 544-548.
Ken Tang, et al., "MAC Reliable Broadcast in Ad Hoc Networks," Computer Science Department, University of California, Los Angeles, 2001 IEEE, pp. 1008-1013.
Mawa, Rakesh, "Power Control in 3G Systems," Hughes Systique Corporation, Jun. 28, 2006.
Microsoft Corporation, "IEEE 802.11 Networks and Windows XP," Windows Hardware Developer Central, Dec. 4, 2001.
Pat Calhoun et al., "802.11r strengthens wireless voice," Technology Update, Network World, Aug. 22, 2005, http://www.networkworld.com/news/tech/2005/082208techupdate.html.
Steger, Christopher et al., "Performance of IEEE 802.11b Wireless LAN in an Emulated Mobile Channel," 2003.
Toskala, Antti, "Enhancement of Broadcast and Introduction of Multicast Capabilities in RAN," Nokia Networks, Palm Springs, California, Mar. 13-16, 2001.
Tsunekawa, Kouichi, "Diversity Antennas for Portable Telephones", 39th IEEE Vehicular Technology Conference, pp. 50-56, vol. 1, Gateway to New Concepts in Vehicular Technology, May 1-3, 1989, San Francisco, CA.
Vincent D. Park, et al., "A Performance Comparison of the Temporally-Ordered Routing Algorithm and Ideal Link-State Routing," IEEE, Jul. 1998, pp. 592-598.
Wennstrom, Mattias et al., "Transmit Antenna Diversity in Ricean Fading MIMO Channels with Co-Channel Interference," 2001.
Yang, Song Li, Virtual AP for 802.11 Seamless Handoff draft-song-80211-seamless-handoff-00.txt.
Extended European Search Report for EP application No. 07755678.5 dated Dec. 29, 2011.
Extended European Search Report for EP application No. 06838713.3 dated Jul. 13, 2011.
Extended European Search Report for EP application No. 12779857.7 dated Mar. 30, 2015.
Extended European Search Report for EP application No. 14163071.5 dated Jul. 4, 2014.
Supplementary European Search Report for EP application No. 07755678.5 dated Jan. 17, 2012.
PCT Application No. PCT/US2006/045893, International Search Report and Written Opinion dated Sep. 25, 2007.
PCT Application No. PCT/US2007/09836, International Search Report and Written Opinion dated Sep. 12, 2008.
PCT Application No. PCT/US2007/09503, International Search Report and Written Opinion dated Mar. 3, 2008.

(56) References Cited

OTHER PUBLICATIONS

PCT Application No. PCT/US2012/036028, International Search Report and Written Opinion dated Aug. 7, 2012.
PCT Application No. PCT/US2013/34997, International Search Report dated Jun. 17, 2013.
PCT Application No. PCT/US2013/34997, Written Opinion dated Jun. 17, 2013 (Date of Online Publication: Oct. 4, 2014).
Chinese Office Action for CN Application No. 200680045272.7 dated Oct. 27, 2011.
Chinese Office Action for CN Application No. 200680045272.7 dated Jul. 12, 2011.
Chinese Office Action for CN Application No. 200680045272.7 dated Feb. 1, 2011.
Chinese Office Action for CN Application No. 200680045272.7 dated Jul. 15, 2010.
Chinese Office Action for CN Application No. 200780019074.8 dated Jun. 15, 2011.
Chinese Office Action for CN Application No. 200780019389.2 dated Sep. 12, 2012.
Chinese Office Action for CN Application No. 200780019389.2 dated Feb. 14, 2012.
Chinese Office Action for CN Application No. 200780019389.2 dated Apr. 8, 2011.
European First Examination Report for EP Application No. 068387133 dated Apr. 3, 2012.
European Second Examination Report for EP Application No. 07755678.5 dated Feb. 3, 2014.
European First Examination Report for EP Application No. 07755678.5 dated Oct. 23, 2012.
European First Examination Report for EP Application No. 07755913.6 dated Jul. 4, 2013.
U.S. Appl. No. 11/607,619, Office Action dated Oct. 13, 2010.
U.S. Appl. No. 11/607,619, Final Office Action dated Dec. 4, 2009.
U.S. Appl. No. 11/607,619, Office Action dated Apr. 29, 2009.
U.S. Appl. No. 13/191,383, Office Action dated Jul. 22, 2013.
U.S. Appl. No. 11/788,371, Final Office Action dated Jan. 21, 2010.
U.S. Appl. No. 11/788,371, Office Action dated Sep. 17, 2009.
U.S. Appl. No. 11/789,446, Final Office Action dated Oct. 13, 2010.
U.S. Appl. No. 11/789,446, Office Action dated May 24, 2010.
U.S. Appl. No. 11/789,446, Final Office Action dated Jun. 24, 2009.
U.S. Appl. No. 11/789,446, Office Action dated Sep. 3, 2008.
U.S. Appl. No. 12/339,688, Office Action dated Sep. 15, 2009.
U.S. Appl. No. 12/845,089, Final Office Action dated Feb. 14, 2012.
U.S. Appl. No. 12/845,089, Office Action dated Sep. 6, 2011.
U.S. Appl. No. 13/590,997, Office Action dated Jul. 18, 2013.
U.S. Appl. No. 14/078,947, Final Office Action dated Feb. 23, 2015.
U.S. Appl. No. 14/078,947, Office Action dated Sep. 24, 2014.
U.S. Appl. No. 13/370,201, Office Action dated May 13, 2013.
U.S. Appl. No. 14/294,012, Office Action dated Mar. 23, 2015.
U.S. Appl. No. 13/439,844, Office Action dated Apr. 22, 2014.
U.S. Appl. No. 13/439,844, Final Office Action dated Oct. 28, 2013.
U.S. Appl. No. 13/439,844, Office Action dated Jun. 5, 2013.
U.S. Appl. No. 13/461,679, Office Action dated Mar. 28, 2014.
U.S. Appl. No. 13/461,679, Final Office Action dated Oct. 25, 2013.
U.S. Appl. No. 13/461,679, Office Action dated Apr. 1, 2013.

\* cited by examiner

KEY ASSIGNMENT FOR A BRAND

CROSS-REFERENCE TO RELATED APPLICATIONS

This application is a continuation and claims the priority benefit of U.S. patent application Ser. No. 13/439,844 filed Apr. 4, 2012, the disclosure of which is incorporated herein by reference.

BACKGROUND

Field of the Invention

The present invention generally relates to key assignment. More specifically, the present invention relates to key assignment for a brand.

Description of the Related Art

An increasing number of individuals and businesses rely on wireless services to carry out various transactions and enable communication from remote locations. Many businesses such as hotels and coffee houses have sought to capitalize on this trend and offer free wireless access to attract and retain customers. A business offering such wireless access may do by creating a "hotspot"—a location that offers Internet access over a wireless local area network through the use of a router connected to a link to an Internet service provider.

Many hotspots only offer open and unsecured communications. Some users, however, may wish to engage in communications or transactions that involve personal, sensitive, or proprietary information that is not necessarily suited for an open and unsecured communications network. As such, users may wish for such transactions be conducted in a secure manner, such that such information may not be exposed or stolen.

Implementing security features is complicated, difficult to maintain, and requires a high level of technical knowledge. An additional complication is that users at a hotspot may be continually changing. Authentication relying on 802.1x/EAP is not a practical option as hotspot users may vary widely in security needs. Setting up a RADIUS server on a network backend may likewise be complicated and unwieldy.

Pre-shared key (PSK)-based security systems require that a secret be manually entered onto all user devices using the network. A PSK-based system relies on a secret shared between and stored at both the client station and the access point. The secret may be, for example, a long bit stream, such as a passphrase, a password, a hexadecimal string, or the like. Used by a client station and the access point to authenticate each other, the secret may also be used to generate an encryption key set.

A disadvantage to PSK-based systems is that once the shared secret becomes known to unauthorized personnel, the security of the entire network is compromised. This may pose a problem where network access is provided to an ever-changing set of numerous, diverse, and transient mobile users. Generally, to maintain the security of a PSK-based system, the secret must be changed on all client stations whenever a person with knowledge of the secret departs from the organization or is no longer authorized to access the network. As a result, many commercial organizations (e.g., small- and medium-sized businesses or enterprises with a high degree of turn over) have been unable to deploy security measures around their hotspots, because of their lack of expertise and/or full-time professional technical support.

In addition, a business (e.g., branded hotels) may have multiple locations where customers are provided service. While wireless internet services may be provided at these multiple locations, the customer is generally required to login and authenticate anew at each location. Such a business may wish to be able to leverage the information previously provided and steps previously performed at one location to facilitate and ease the customer experience at a second location. As used herein, a brand refers to any related products or services that may be provided at a plurality of locations. A branded hotspot, for example, may be a hotspot associated with a particular coffee shop that is associated with a chain of coffee shops, each of which may have its own branded hotspot.

SUMMARY OF THE CLAIMED INVENTION

Embodiments of the present invention include systems and methods for providing secured network access at a branded hotspot. A user device located within range of a branded hotspot initiates a request for the secured network access. The request concerns secured network access at the hotspot by the user device and includes a unique pre-shared key. A query regarding the unique pre-shared key is sent to a database, which retrieves information regarding a corresponding pre-shared key. That information is sent to the hotspot controller, which allows the user device secured network access as governed by one or more parameters associated with the pre-shared key.

Various embodiments of the present invention include methods for providing secured network access at a branded hotspot. Such methods may include receiving a request for secured network access initiated by a user device located within a range of a hotspot associated with a brand. The request may include a unique pre-shared key associated with the user device. Methods may further include sending a query to a database of pre-shared keys concerning the unique pre-shared key included in the request, receiving a response to the query including a corresponding pre-shared key regarding secured network access that has been generated at another hotspot associated with the brand, and providing secured network access at the hotspot based on the unique pre-shared key associated with the user device and the corresponding pre-shared key.

Additional embodiments include apparatuses for providing secured network access at a branded hotspot. Such apparatuses may include an interface for receiving an incoming request initiated by a user device located within a range of a hotspot associated with a brand and a processor for executing instructions stored in memory to generates a query to a database of pre-shared keys concerning the unique pre-shared key included in the request. The interface may further receive a response to the query including a corresponding pre-shared key regarding secured network access that has been generated at another hotspot associated with the brand, and secured network access may be provided at the hotspot based on the unique pre-shared key associated with the user device and the corresponding pre-shared key.

Embodiments of the present invention may further include systems for providing secured network access at a branded hotspot. Such systems may include a hotspot controller controlling a branded hotspot and comprising an interface that receives an incoming request for secured network access concerning a unique pre-shared key and initiated by a user device located within a range of the branded hotspot, sends a query to a database of pre-shared keys concerning the unique pre-shared key included in the request, and receives a response to the query including a corresponding pre-shared key regarding secured network access that has been generated at another hotspot associated with the brand. Systems may further include an access point associated with the branded hotspot that provides secured network access based on the unique pre-shared key associated with the user device and the corresponding pre-shared key.

Other embodiments of the present invention include non-transitory computer-readable storage media on which is embodied instructions executable to providing secured network access at a branded hotspot in general accordance with the method previously set forth above.

DETAILED DESCRIPTION

Secured network access at a branded hotspot is provided. A user device located within range of the hotspot initiates a request sent via an open communication network associated with the hotspot. The request concerns secured network access at the hotspot by the user device and includes a unique pre-shared key. A query regarding the unique pre-shared key is sent to a database, which retrieves information regarding a corresponding pre-shared key. That information is sent to the hotspot controller, which allows the user device secured network access as governed by one or more parameters associated with the pre-shared key.

Figure 1:
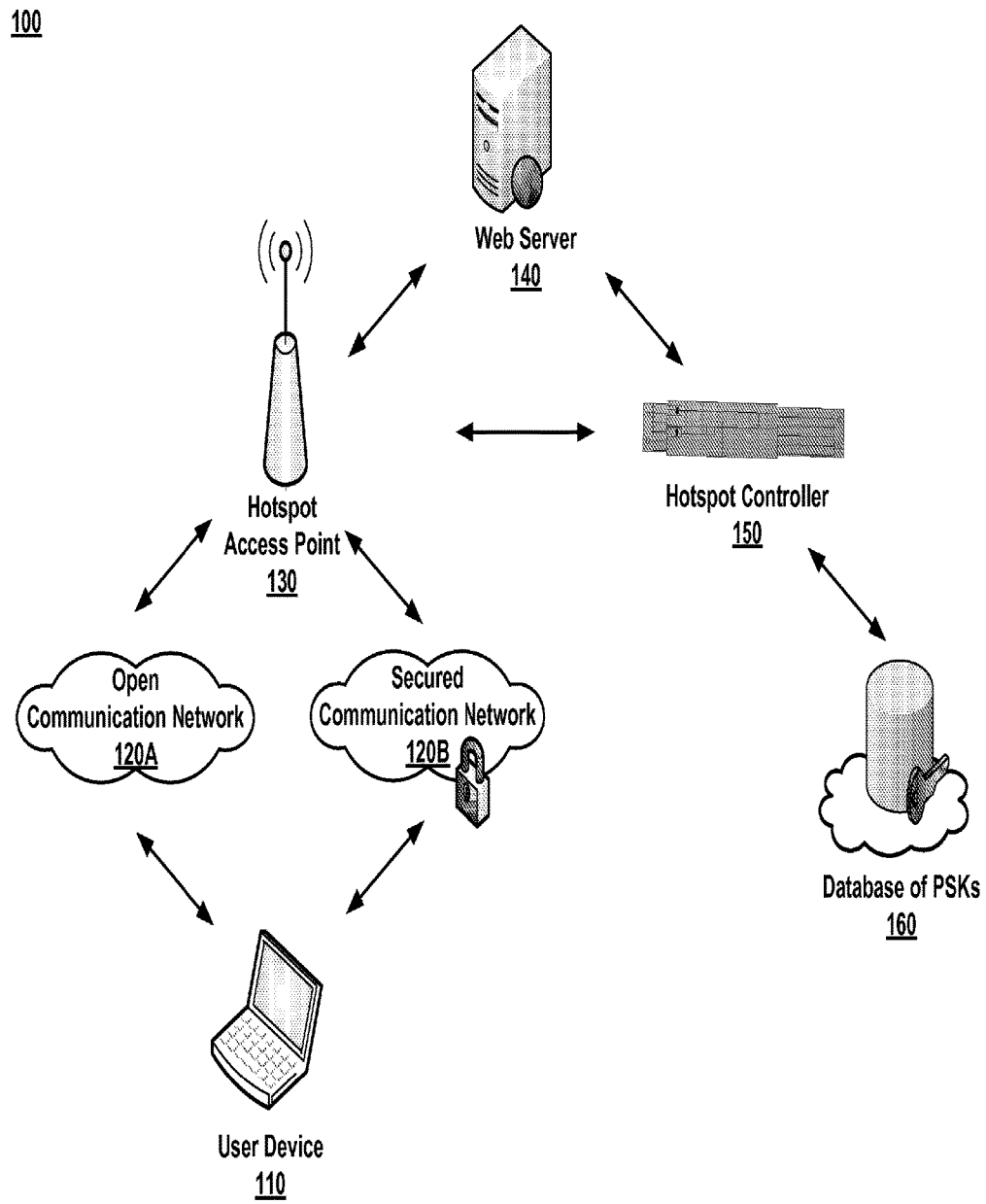
FIG. 1 illustrates a network environment in which a system for providing secured network access at a branded hotspot may be implemented.

FIG. 1 illustrates a network environment 100 in which a system for secured network access at a branded hotspot may be implemented. Network environment 100 may include a user device 110 and a 'hotspot' including access point 130 and that provides open communication network 120A and secured communication network 120B. The network environment 100 may further include web server 140, a hotspot controller 150, and a database of pre-shared keys 160.

Users may use any number of different wireless user devices 110 such as notebook, netbook, and tablet computers with WiFi capability, smartphones with WiFi capability, or any other type of wireless computing device capable of communicating over communication networks 120. User device 110 may also be configured to access data from other storage media, such as memory cards or disk drives as may be appropriate in the case of downloaded services. User device 110 may include standard hardware computing components such as network (e.g., wireless) and media interfaces, non-transitory computer-readable storage (memory), and processors for executing instructions that may be stored in memory.

Communication networks 120A-B may convey various kinds of information to user devices, such as user device 110. Communication networks 120A-B may be a local, proprietary network (e.g., an intranet) and/or may be a part of a larger wide-area network. The communications network 120A-B may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Communications networks 120A-B allow a connecting device (e.g., user device 110) to access the Internet. Open communication network 120A is open and unsecured. As such, any user device 110 may be able to connect to the open communication network 120A without (much) restriction. In contrast, secured communication network 120B may involve various security policies and protocols so that communications to and from user device 110 may remain secure.

Communication networks 120A-B are provided by a hotspot access point 130, which can transmit various electromagnetic waves. Examples of wireless protocols that might be used by hotspot access point 130 include IEEE 802.11 (Wi-Fi or Wireless LAN), IEEE 802.16 (WiMAX), or IEEE 802.16c network. Hotspot may be inclusive or a number of wireless transceivers distributed over an area.

Access point 130 includes, at the least, an antenna system, radio, memory, and processor. The antenna system wirelessly receives and transmits data packets. For example, the antenna system can receive packet data such as Transmission Control Protocol (TCP) and User Datagram Protocol (UDP) packet data using the IEEE 802.11 wireless protocol. Radio converts data into the requisite wireless protocols. Various instructions governing the control of the access point 130 are stored in memory and executed by processor.

One or more wireless or wired connections may be created to allow for data transmission between access point 130 and user device 110 (via communication networks 120A-B) as well as web server 140, hotspot controller 150, and various other access points in network environment 100. The antenna may further include selectable antenna elements like those disclosed in U.S. Pat. No. 7,292,198 for a "System and Method for an Omnidirectional Planar Antenna Apparatus," the disclosure of which is incorporated herein by reference. Hotspot access point 130 may also utilize various transmission parameter controls like those disclosed in U.S. Pat. No. 7,889,497 for a "System and Method for Transmission Parameter Control for an Antenna Apparatus with Selectable Elements," the disclosure of which is incorporated herein by reference.

Web server 140 may include any type of server or other computing device as is known in the art for communication over the Internet (web). Web server 140 may include standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Hotspot controller 150 manages the one or more hotspot access points 130 in network environment 100. As such, the hotspot controller 150 intelligently manages the hotspot wireless services, including deployment, RF assignments, traffic/load balancing, and security. In terms of security, for example, the hotspot controller 150 may receive a request that a user device 110 be allowed to use the secured communication network 120B. The hotspot controller 150 may be located remotely (e.g., in the cloud) or in the same local area network as the hotspot access point 130.

In some instances, the hotspot controlled by hotspot controller 150 may be associated with a particular brand (e.g., hotel or coffee shop chain). When a user device 110 that is new to a brand requests secure network access, the request may be redirected to web server 140, which may convey the request to hotspot controller 150. Hotspot controller 150 dynamically generates a unique pre-shared key for the requesting user device 110 and return the key to web portal server 140, which in turns generates a web page displaying the unique pre-shared key to the user device 110. User device 110 may then use the pre-shared key in a request to access secure communication network 120B. Information regarding the pre-shared key associated with user device 110 is further sent by hotspot controller 150 to database of pre-shared keys 160 for storage.

The database of pre-shared keys 160 is accessible via the cloud (e.g., Internet) and stores a plurality of pre-shared keys associated with a brand. In some instances, the database 160 may store keys for a plurality of brands. The pre-shared keys and related information (e.g., associated parameter(s) for secured network access) may provided by a plurality of branded hotspots. Because the database 160 is located in the cloud, any hotspot controller 150 may send a query to the database 160 when an unfamiliar (to the hotspot controller 150) user device 110 submits an unfamiliar pre-shared key in a request for secured network access.

In some cases, the user device 110 may wish to request secured network access at another hotspot that is associated with the same brand but that is new to the user device 110. Because the user device 110 is already associated with a pre-shared key, the request sent by user device 110 may be sent using secured communication network 120B to hotspot controller 150. Since the user device 110 is new to this particular hotspot controller 150, a query regarding the pre-shared key is sent to database of pre-shared keys 160. In response to the query, the database 160 retrieves information regarding a corresponding pre-shared key. Such information may additionally include parameters of the secured network access to be provided to the user device 110.

Figure 2:
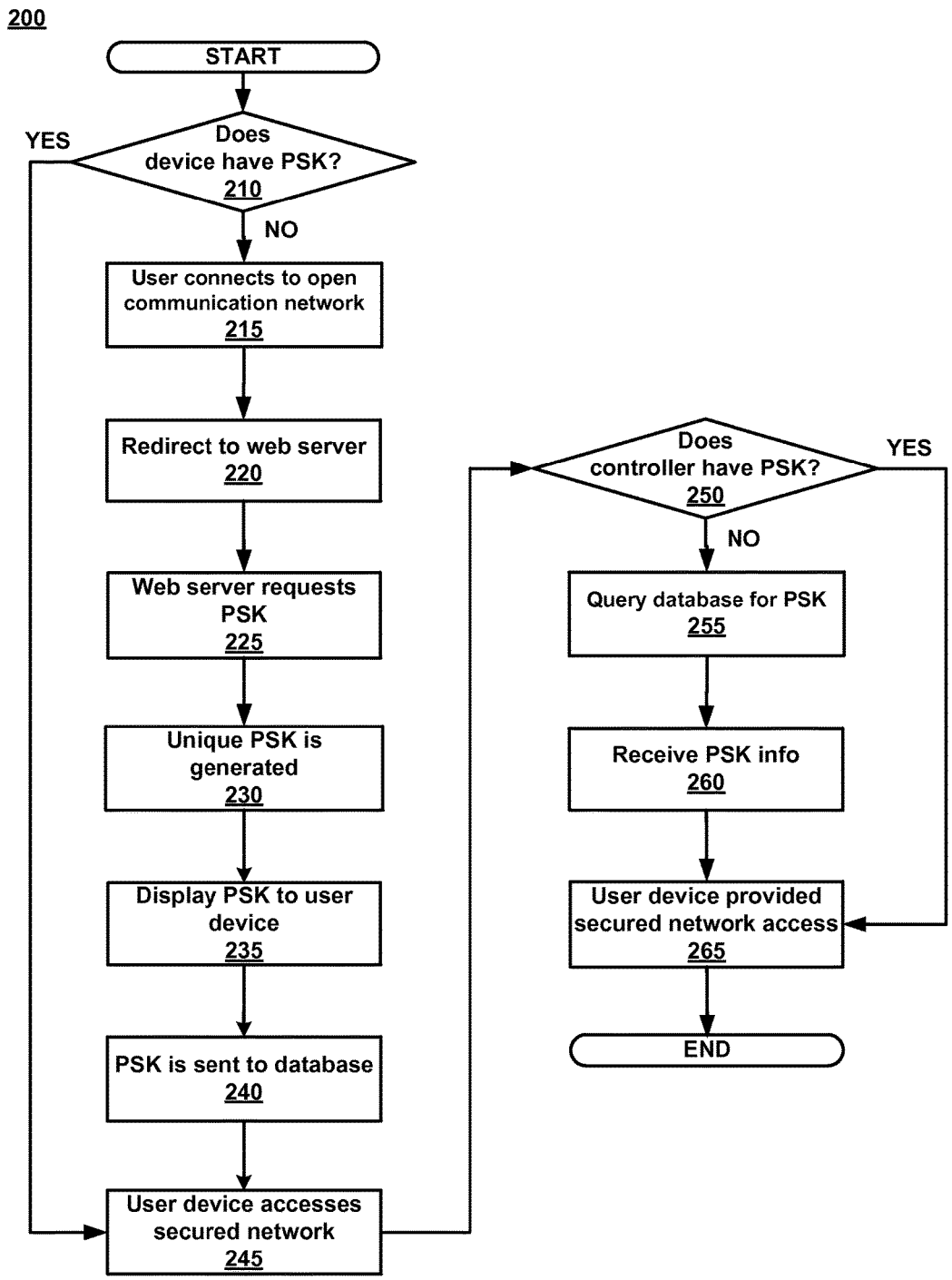
FIG. 2 illustrates a method for providing secured network access at a branded hotspot.

FIG. 2 illustrates a method 200 for providing secure network access at a branded hotspot. The method 200 of FIG. 2 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 2 (and the order thereof) are exemplary and may include various alternatives, equivalents, or derivations thereof including but not limited to the order of execution of the same.

In method 200 of FIG. 2, it is determined whether the user device is already associated with a pre-shared key. If so, the user device connects to an open communication network hosted by a hotspot access point. The request is redirected to a web server, which requests a pre-shared key from a hotspot controller. The hotspot controller may generate and return the unique pre-shared key to the web portal server, which generates a webpage displaying the unique pre-shared key to the user device. The user device may then use the unique pre-shared key to access the secure communication network. Where the user device already has a pre-shared key, the user device may immediately connect to the secured communication network.

It is further determined whether the controller has a corresponding pre-shared key. Where the particular controller generated the key, for example, the controller may already have a corresponding key stored in memory. In some cases, however, the user device may be requesting secured network access from another hotspot new to the user device, but associated with the same brand as the hotspot where the pre-shared key was generated. The particular controller at the new hotspot may request the database for information regarding the pre-shared key associated with the user device. Such information may be retrieved and sent to the new hotspot, and secured network access is provided to the user device in accordance with the retrieved information.

In step 210, it is determined whether the user device 110 has already been associated with a pre-shared key. In such a scenario, user device 110 is within a range of a branded hotspot and is attempting to connect to a secured wireless network. If the user device 110 is already associated with a pre-shared key (e.g., previously generated at the branded hotspot or at another hotspot associated with the same brand), the method may skip ahead to step 245. If the user device 110 is not already associated with a pre-shared key, the method proceeds to step 215.

In step 215, a user device 110 connects to an open communication network 120A provided by hotspot access point 130. For some network activity (e.g., reading the news), the user may not necessarily require security and the use of the open communication network 120A may be sufficient. Some transactions (e.g., financial or business related) may require additional security so as to ensure that sensitive information is not exposed or misappropriated by other users of the open communication network 120A. The user of device 110 may be offered access to the secured communication network 120B as an option. Upon selection of that offering, a user request for access to the secure communication network 120B may be sent over the open communication network 120A. Connection to the open communication network 120A may, in some implementations, automatically initiate a request for secure access to the secured communication network 120B.

In step 220, the request for secure network access is redirected to web portal server 140. In addition to information regarding the particular user device 110, the access request may include information concerning various policies and parameters as determined by the particular entity (e.g., business) providing wireless access at the hotspot. These parameters and policies may include information used to configure a wireless device for connection to a restricted wireless network and access policies related to the same, such as a wireless network name, wireless device parameters, adapter configurations, security-related parameters, access constraints, quality of service parameters, security-related parameters, expiration date of the secure access, limits on session duration, bandwidth, user identity, user rewards, and access policies.

In step 225, the web portal server 140 submits a request for a unique pre-shared key to hotspot controller 150. Assigning each individual user/user device 110 a unique pre-shared key ensures that third-parties cannot eavesdrop on or otherwise access information belonging to another user accessing the network by way of device 110. Because each pre-shared key is unique, the encryption (and decryption) of information belonging to one particular user is different from that for any other user. Moreover, when the user leaves the hotspot, the unique pre-shared key assigned to that user/user device 110 does not need to be changed to maintain security for users remaining in the hotspot.

In step 230, the hotspot controller 150 generates a unique pre-shared key for the requesting user device 110 and sends the generated unique pre-shared key to the web portal server 140. Hotspot controller 150 may randomly generate the unique pre-shared secret for each user device 110 using various algorithms and formulas. By providing for randomly generated and unique keys, hotspot controller 150 increases the difficulty of illicitly gaining accessing user information by deducing the secret of any particular user.

Hotspot controller 150 may also store information associating the particular key with the requesting user device 110. Where a particular business providing the hotspot wishes to apply certain policies and parameters, those policies and parameters may also be stored. A hotel, for example, may wish to provide frequent guests with greater bandwidth than other guests. As such, information regarding the guest identity, the user device 110 belonging to the guests (e.g., as identified by MAC address) and the amount of bandwidth allotted may also be stored in association with the unique pre-shared key.

In step 235, the web portal server 140 generates a webpage to display the unique pre-shared key to the user of user device 110.

In step 240, information regarding the generated pre-shared key is sent from the hotspot controller 150 to the database of pre-shared keys 160. Any related information (e.g., policies and parameters described in relation to step 220) may also be sent to database 160 for storage and retrieval in response to subsequent queries.

In step 245, the unique pre-shared key is entered into user device 110, either manually by the user (e.g., a cut and paste operation), via user selection (e.g., execution of a script associated with a 'install' button), or automatically as a result of instructions embedded with a pre-shared key download package. A subsequent request for access to the secure communication network 120B is generated based on the unique pre-shared key. In some instances, the unique pre-shared key may be bundled as part of a package that may be installed automatically or upon request on the user device 110. The package may include any applications, policies, or parameters required for connection to the secure communication network 120B. For example, an application may be downloaded to the wireless device and executed to survey, configure (e.g., install parameters and policies), and/or connect the wireless device to the secured communication network 120B. The unique pre-shared key may then be used to authenticate the user device 110 so that the user device 110 can access the secured communication network 120B according to the installed policies and parameters.

In step 250, it is determined whether the hotspot controller 150 has a corresponding pre-shared key. In instances where the user device 110 is a repeat user of the same hotspot, the associated hotspot controller 150 may already have a corresponding pre-shared key in memory and the method may skip ahead to step 265. Where secured network access is being requested from a hotspot new to the user device 110, the hotspot controller 150 at this new hotspot may not have a corresponding pre-shared key, and the method proceeds to step 255.

In step 255, a query is generated and sent to a database of pre-shared keys 160. The query may include information regarding the user device 110 that may be used to identify the pre-shared key associated with the user device 110, and other associated information (e.g., policies and parameters described in relation to step 220). In some embodiments, the query may include information to identify the user device 110 (e.g., the MAC address).

In step 260, the pre-shared key information is retrieved from the database 160. Using the information in the query, the database 160 may identify that the user device 110 has been provided with a pre-shared key at a hotspot associated with the same brand as the hotspot (i.e., hotspot controller 150) that sent the query. In addition, certain policies and parameters may have been associated with that pre-shared key at other hotspots at other locations. For example, a customer may accumulate points by staying at a variety of locations of a branded hotel chain. Parameters of secured network access may be adjusted (e.g., higher bandwidth) as a reward to frequent customers. As such, information regarding a corresponding pre-shared key (including related policies and parameters) may be sent to the hotspot controller 150 in response to the query.

In step 265, secured network access is provided to the user device 110 in accordance with the parameters and policies indicated by the query response sent from the database 160. In addition, the current hotspot 160 may update 160 regarding any information that may affect the parameters and policies associated with the secured network access to be provided to the user device 110.

The present invention may be implemented in a variety of devices. Non-transitory computer-readable storage media refer to any non-transitory storage medium or media that participate in providing instructions to a central processing unit (CPU) for execution. Such media can take many forms, including, but not limited to, non-volatile and volatile media, which may include optical disks, dynamic memory, floppy disks, flexible disks, hard disks, magnetic tape, any other magnetic medium, CD-ROM disks, digital video disks (DVDs), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art along with their full scope of equivalents.

What is claimed is:

1. A method for providing secured communication network access, the method comprising:
    storing information about a plurality of hotspots in a cloud brand database, each hotspot associated with a same brand and located at a different location;
    receiving a request for access to a secured communication network, the request initiated over an open communication network by a requesting user device located within a range of a first hotspot of the plurality of stored hotspots associated with said same brand;
    generating, in response to the request for secured communication network access, a unique pre-shared encryption key, the unique pre-shared encryption key being unique to the requesting user device and being associated with the requesting user device based on information regarding the requesting user device;

providing, in response to the request for secured communication network access, the unique pre-shared encryption key associated with the requesting user device, the unique pre-shared encryption key providing the requesting user device with access to the secured communication network via the first hotspot, by authenticating the requesting user device to the secured communication network;

sending the unique pre-shared encryption key to the cloud brand database for storage, the cloud brand database storing a plurality of pre-shared encryption keys generated at a plurality of different hotspots associated with the same brand, wherein each pre-shared encryption key is different and is unique to an associated user device;

receiving a subsequent request for access to said secured communication network from the requesting user device when the requesting user device is located within a range of a second hotspot associated with the same brand, the second hotspot being located at a different location from the first hotspot and being new to the requesting user device;

sending a query to the cloud brand database to determine whether the requesting user device is already associated with the unique pre-shared encryption key that had been generated during prior use at the first hotspot and associated with the same brand;

receiving a response to the query including the unique pre-shared encryption key that had been generated during prior use at the first hotspot associated with the same brand, when it is determined that the requesting user device is already associated with the unique pre-shared encryption key; and providing the requesting user device with access to the secured communication network via the second hotspot, using the unique pre-shared encryption key that had been generated during prior use at the first hotspot.

2. The method of claim 1, further comprising initially displaying an offer regarding access to the secured communication network, wherein the request is received in response to the offer.

3. The method of claim 1, further comprising initially determining that the user device is not already associated with any pre-shared key.

4. The method of claim 3, further comprising generating the unique pre-shared encryption key, based on determination that the user device is not already associated with any pre-shared key.

5. The method of claim 1, further comprising storing the unique pre-shared encryption key in association with policies and parameters provided in the request sent over the open communication network.

6. The method of claim 5, further comprising storing the unique pre-shared encryption key in association with an allotted bandwidth.

7. The method of claim 6, further comprising adjusting the allotted bandwidth based on a reward system associated with the same brand.

8. The method of claim 5, further comprising providing the associated policies and parameters for storage in the cloud brand database.

9. The method of claim 6, further comprising providing the allotted bandwidth for storage in the cloud brand database.

10. A system for providing secured communication network access, the system comprising:

a first hotspot associated with a same brand that receives a request for secured communication network access, the request initiated over an open communication network by a requesting user device located within a range of the first hotspot and that generates, in response to the request for secured communication access, a unique pre-shared encryption key, the unique pre-shared encryption key being unique to the requesting user device and being associated with the requesting user device based on information regarding the requesting user device;

a web server that provides, in response to the request for secured communication network access, the unique pre-shared encryption key providing the requesting user device with access to the secured communication network via the first hotspot, by authenticating the requesting user device to the secured communication network;

a cloud brand database that stores information about a plurality of hotspots, each hotspot associated with a same brand and located at a different location and a plurality of pre-shared encryption keys generated at a plurality of different hotspots associated with the same brand, wherein each pre-shared encryption key is different and is unique to an associated user device;

a second hotspot located at a different location from the first hotspot and being new to the requesting user device and associated with the same brand that receives a subsequent request for access to said secured communication network from the requesting user device when the requesting user device is located within a range of the second hotspot; and a hotspot controller that
sends a query to the cloud brand database to determine whether the requesting user device is already associated with the unique pre-shared encryption key that had been generated during prior use at the first hotspot and associated with the same brand, receives a response to the query including the unique pre-shared encryption key that had been generated during prior use at the first hotspot associated with the same brand, when it is determined that the requesting user device is already associated with the unique pre-shared encryption key, and provides the requesting user device with access to the secured communication network via the second hotspot, using the unique pre-shared encryption key that had been generated during prior use at the first hotspot.

11. The system of claim 10, wherein the first hotspot initially provides a displayed offer regarding access to the secured communication network, wherein the request is received in response to the offer.

12. The system of claim 10, wherein the first hotspot initially determines that the user device is not already associated with any pre-shared key.

13. The system of claim 12, wherein the hotspot controller generates the unique pre-shared encryption key.

14. The system of claim 10, wherein the hotspot controller stores the unique pre-shared encryption key in association with policies and parameters provided in the request sent over the open communication network.

15. The system of claim 14, wherein the hotspot controller further stores the unique pre-shared encryption key in association with an allotted bandwidth.

16. The system of claim 15, wherein the hotspot controller further adjusts the allotted bandwidth based on a reward system associated with the same brand.

17. The system of claim 10, wherein the hotspot controller further provides the unique pre-shared encryption key for storage in the cloud brand database.

18. The system of claim 15, wherein the hotspot controller further provides the allotted bandwidth for storage in the cloud brand database.

19. A non-transitory computer-readable storage medium, having embodied thereon a program executable by a processor to perform a method for providing secured communication network access, the method comprising:

storing information about a plurality of hotspots in a cloud brand database, each hotspot associated with a same brand and located at a different location;

receiving a request for access to a secured communication network, the request initiated over an open communication network by a requesting user device located within a range of a first hotspot of the plurality of stored hotspots associated with said same brand;

generating, in response to the request for secured communication network access, a unique pre-shared encryption key, the unique pre-shared encryption key being unique to the requesting user device and being associated with the requesting user device based on information regarding the requesting user device;

providing, in response to the request for secured communication network access, the unique pre-shared encryption key associated with the requesting user device, the unique pre-shared encryption key providing the requesting user device with access to the secured communication network via the first hotspot, by authenticating the requesting user device to the secured communication network;

sending the unique pre-shared encryption key to the cloud brand database for storage, the cloud brand database storing a plurality of pre-shared encryption keys generated at a plurality of different hotspots associated with the same brand, wherein each pre-shared encryption key is different and is unique to an associated user device;

receiving a subsequent request for access to said secured communication network from the requesting user device when the requesting user device is located within a range of a second hotspot associated with the same brand, the second hotspot being located at a different location from the first hotspot and being new to the requesting user device;

sending a query to the cloud brand database to determine whether the requesting user device is already associated with the unique pre-shared encryption key that had been generated during prior use at the first hotspot and associated with the same brand;

receiving a response to the query including the unique pre-shared encryption key that had been generated during prior use at the first hotspot associated with the same brand, when it is determined that the requesting user device is already associated with the unique pre-shared encryption key; and providing the requesting user device with access to the secured communication network via the second hotspot, using the unique pre-shared encryption key that had been generated during prior use at the first hotspot.

* * * * *